US012107324B2

(12) United States Patent
Chang

(10) Patent No.: US 12,107,324 B2
(45) **Date of Patent: *Oct. 1, 2024**

(54) MULTI-SECTION ANTENNA WITH A SHARED RADIATOR

(71) Applicant: NANJING SILERGY MICRO (HK) CO., LIMITED, Causeway Bay (HK)

(72) Inventor: Chia-Lin Chang, Taipei (TW)

(73) Assignee: Nanjing Silergy Micro (HK) Co., Ltd., Hong Kong (CN)

( * ) Notice: Subject to any disclaimer, the term of this patent is extended or adjusted under 35 U.S.C. 154(b) by 133 days.

This patent is subject to a terminal disclaimer.

(21) Appl. No.: 17/477,577

(22) Filed: Sep. 17, 2021

(65) Prior Publication Data

US 2022/0102844 A1 Mar. 31, 2022

(30) Foreign Application Priority Data

Sep. 30, 2020 (CN) ......................... 202011061060.6

(51) Int. Cl.
*H01Q 1/24* (2006.01)
*H01Q 1/27* (2006.01)

(52) U.S. Cl.
CPC ............. *H01Q 1/273* (2013.01); *H01Q 1/243* (2013.01)

(58) Field of Classification Search
CPC ............ H01Q 1/27; H01Q 1/273; H01Q 1/24; H01Q 1/243; H01Q 5/307; H01Q 5/378; H01Q 5/385; H01Q 21/28; H04R 1/10; H04R 1/1041; H04R 1/105; H04R 2420/07
See application file for complete search history.

(56) References Cited

U.S. PATENT DOCUMENTS

| | | | | |
|---|---|---|---|---|
| 8,577,289 | B2 * | 11/2013 | Schlub | G01B 7/023 343/702 |
| 9,374,119 | B1 * | 6/2016 | Chou | H04B 1/3838 |
| 11,374,319 | B2 * | 6/2022 | Kim | H01Q 5/314 |
| 11,722,810 | B2 * | 8/2023 | Chang | H01Q 1/273 381/74 |
| 2011/0012793 | A1 * | 1/2011 | Amm | H01Q 1/44 343/702 |
| 2013/0241796 | A1 * | 9/2013 | Nagumo | H04B 1/0458 343/861 |
| 2018/0212313 | A1 * | 7/2018 | Harper | H01Q 5/321 |
| 2020/0021029 | A1 * | 1/2020 | Chou | H01Q 9/0421 |
| 2021/0273340 | A1 * | 9/2021 | Sun | H01Q 5/10 |

* cited by examiner

*Primary Examiner* — Thai Pham

(57) ABSTRACT

A multi-section antenna with a shared radiator and a wearable device applying the antenna. The multi-section antenna with a shared radiator comprises a plurality of antenna modules, a radio frequency module and at least one sensing module. The plurality of antenna modules are coupled to each other through a first capacitor structure. The radio frequency module is coupled with one of the antenna modules through a second capacitor structure. The radio frequency module is used to receive or transmit radio frequency signals by the antenna module. The sensing module is coupled with the antenna module through a first inductor, and the sensing module is used to sense a capacitance value of a parasitic capacitance of the antenna module.

12 Claims, 7 Drawing Sheets

MULTI-SECTION ANTENNA WITH A SHARED RADIATOR

RELATED APPLICATIONS

The present application claims the priority of Chinese Application No. 202011061060.6, filed Sep. 30, 2020, the disclosure of which is hereby incorporated by reference herein in its entirety.

BACKGROUND OF THE INVENTION

1. Field of the Invention

The present disclosure generally relates to a multi-section antenna with a shared radiator, and, more particularly, to a multifunctional multi-section antenna with a shared radiator capable of receiving and sending radio frequency signal and sensing distance, and a wearable device using the antenna.

2. Description of the Related Art

In general, when a wearable device, such as earphones, needs to sense whether a human body contacts the device or the distance between the human body and the device, the sensing ability will be achieved by a sensing radiator and a sensing module coupled with the sensing radiator. More specifically, the sensing module determines the distance by sensing a change of the capacitance value of the sensing radiator. On the other hand, the wearable device also needs an antenna radiator to receive or transmit radio frequency signals for communication in order to achieve the wireless communication.

However, the sensing signal for sensing the human body and the radio frequency signal for communication will interfere with each other. It can be solved by adding an isolation element or increasing the distance between the antenna radiator and the sensing radiator in the prior art. Either way goes against the miniaturization of the wearable device and may increase costs. Therefore, how to provide a multifunctional multi-section antenna with a shared radiator capable of receiving and sending radio frequency signal and sensing distance, and a wearable device using the antenna has become an urgent problem to be solved in the industry.

SUMMARY OF THE INVENTION

In light of solving the foregoing problems of the prior art, the present invention provides a multi-section antenna with a shared radiator comprising a plurality of antenna modules, a radio frequency module and at least one sensing module. The plurality of antenna modules are coupled to each other through a first capacitor structure. The radio frequency module is coupled with one of the antenna modules through a second capacitor structure. The radio frequency module is used to receive or transmit radio frequency signals by the coupled antenna module. The at least one sensing module is coupled with the antenna module through a first inductor, and the sensing module is used to sense a capacitance value of a parasitic capacitance of the antenna module.

In an embodiment, the first capacitor structure is a distributed capacitor structure or a lumped distributed capacitor structure.

In an embodiment, the second capacitor structure is a distributed capacitor structure or a lumped distributed capacitor structure.

In an embodiment, the multi-section antenna with a shared radiator comprises a plurality of the sensing modules. Each of the sensing modules is coupled to each of the corresponding antenna modules through each of the first inductors, and each sensing module is used to sense the capacitance value of the parasitic capacitance of the corresponding antenna module.

In an embodiment, the number of the sensing modules is identical to the number of the antenna modules.

In an embodiment, the multi-section antenna with a shared radiator further comprises a processing module. The processing module is connected to the sensing module. The processing module is used to determine the distance between an object and the antenna module or whether the object contacts the antenna module according to the capacitance value measured by the sensing module.

In an embodiment, the multi-section antenna with a shared radiator comprises a plurality of the sensing modules, and the processing module is further used to determine the contact between the object and the antenna modules in chronological order.

In an embodiment, the antenna module has a rectangular shape.

In an embodiment, the antenna modules have a total length which is equal to ⅛ to 1 wavelength of the radio frequency signal.

The present invention further provides a multi-section antenna with a shared radiator comprising a first antenna module, a second antenna module, a first capacitor structure, a second capacitor structure, a radio frequency module, a first inductor, a first sensing module, a second inductor and a second sensing module. The first capacitor structure is coupled between the first antenna module and the second antenna module. The second capacitor structure is coupled with the first antenna module. The radio frequency module is coupled with the second capacitor structure. The radio frequency module is used to receive or transmit radio frequency signals by the first antenna module and the second antenna module. The first inductor is coupled with the first antenna module. The first sensing module is coupled with the first inductor. The second inductor is coupled with the second antenna module. The second sensing module is coupled with the second inductor.

In an embodiment, the multi-section antenna with a shared radiator further comprises a third antenna module, a third capacitor structure, a third inductor and a third sensing module. The third capacitor structure is coupled between the second antenna module and the third antenna module. The third inductor is coupled with the third antenna module. The third sensing module is coupled with the third inductor. The radio frequency module is used to receive or transmit radio frequency signals by the first antenna module, the second antenna module, and the third antenna module.

In an embodiment, the first capacitor structure or the second capacitor structure is a distributed capacitor structure or a lumped distributed capacitor structure.

In an embodiment, the third capacitor structure is a distributed capacitor structure or a lumped distributed capacitor structure.

In an embodiment, the multi-section antenna with a shared radiator further comprises a processing module. The processing module is connected to the first sensing module and the second sensing module. The processing module is used to determine the distance between an object and the first antenna module or the distance between an object and the second antenna module or whether the object contacts the first antenna module or the second antenna module according to the capacitance value of the parasitic capacitance of the first antenna module or the second antenna module measured by the first sensing module or the second sensing module respectively.

In an embodiment, the processing module is further used to determine the contact between the object and the first antenna module and/or the contact between the object and the second antenna module in chronological order.

In an embodiment, the multi-section antenna with a shared radiator further comprises a processing module. The processing module is connected to the first sensing module, the second sensing module and the third sensing module. The processing module is used to determine the distance between an object and the first antenna module, the distance between an object and the second antenna module or the distance between an object and the third antenna module or whether the object contacts the first antenna module, the second antenna module or the third antenna module according to the capacitance value of the parasitic capacitance of the first antenna module, the second antenna module or the third antenna module measured by the first sensing module, the second sensing module or the third sensing module respectively.

In an embodiment, the processing module is further used to determine the contact between the object and the first antenna module, the contact between the object and the second antenna module and the contact between the object and the third antenna module in chronological order.

In an embodiment, the first antenna module, the second antenna module or the third antenna module has a rectangular shape.

In an embodiment, the first antenna module, the second antenna module and the third antenna module have a total length which is equal to ⅛ to 1 wavelength of the radio frequency signal.

The present invention further provides a wearable device comprising a main body and a multi-section antenna with a shared radiator according to any one of said embodiments. The main body is used to be worn on a part of a human body. The multi-section antenna with a shared radiator is disposed on the main body.

In an embodiment, the wearable device further comprises an audio module. The audio module is disposed on the main body. The audio module is used for playing corresponding audio according to the radio frequency signal received by the multi-section antenna with a shared radiator.

In an embodiment, the wearable device is a set of earphones, a watch or a pair of glasses.

Compared to the prior art, the multi-section antenna with a shared radiator according to the present invention comprises a plurality of antenna modules coupled through a first capacitive structure. The antenna modules are coupled with a radio frequency module through a second capacitor structure. The radio frequency module is used to receive or transmit radio frequency signals by the antenna modules. On the other hand, the antenna modules are further coupled with a sensing module through a first inductor. The sensing module is used to sense a capacitance value of a parasitic capacitance of the antenna module. In other words, the radio frequency module and the sensing module can share the antenna modules, so the space and cost of the radiator structure can be saved. The first capacitor structure, the second capacitor structure and the first inductor can effectively separate the high and low frequency signals, so the high frequency signal of the radio frequency module and the low frequency signal of the sensing module will not interfere with each other. The multi-section antenna with a shared radiator according to the present invention is able to receive and send radio frequency signals and sense the distance at the same time.

BRIEF DESCRIPTION OF THE DRAFLAPS

FIG. 1 illustrates a schematic view of a structure of the multi-section antenna with a shared radiator according to a first embodiment of the present invention.

FIGS. 2*a* and 2*b* illustrate schematic views of a structure of the distributed capacitor structure according to a second embodiment of the present invention.

DETAILED DESCRIPTION

The present invention is described by the following specific embodiments. Those with ordinary skills in the arts can readily understand other advantages and functions of the present invention after reading the disclosure of this specification. Any changes or adjustments made to their relative relationships, without modifying the substantial technical contents, are also to be construed as within the range implementable by the present invention.

Figure 1:
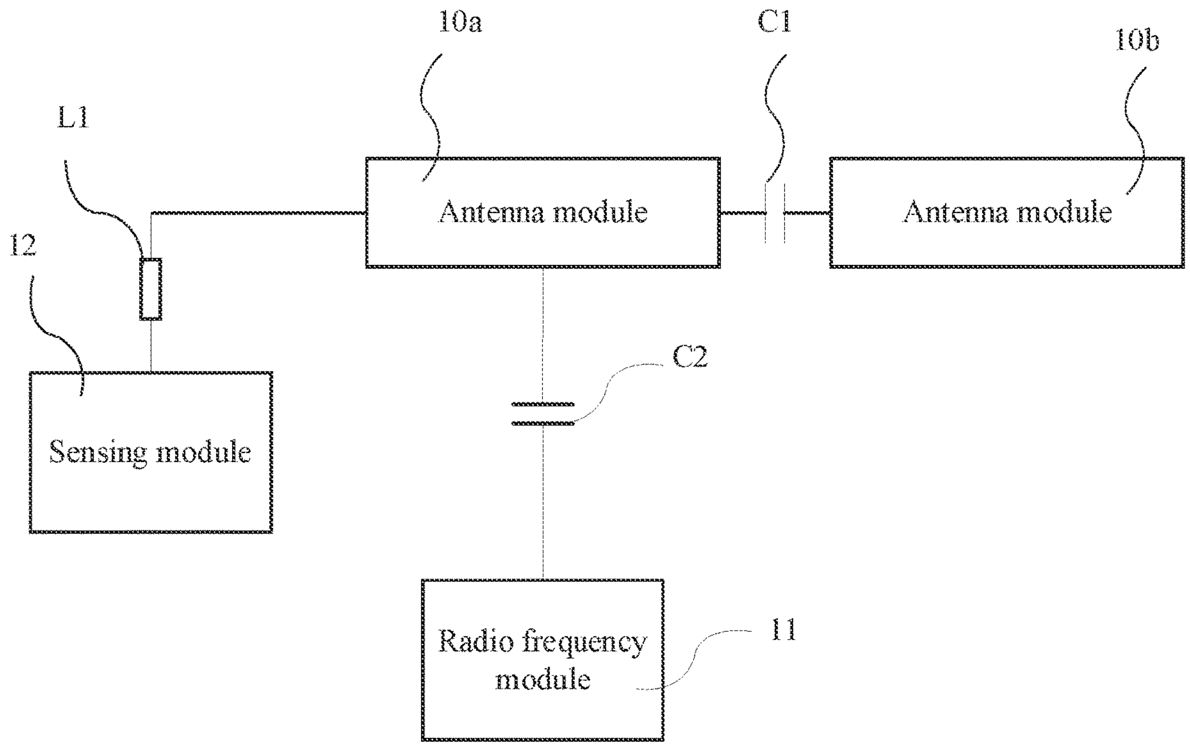

Please refer to FIG. 1. FIG. 1 illustrates a schematic view of a structure of the multi-section antenna with a shared radiator according to a first embodiment of the present invention. As shown in the figure, the multi-section antenna with a shared radiator according to the present invention comprises a plurality of antenna modules 10*a* and 10*b*, a radio frequency module 11 and at least one sensing module 12.

The antenna modules 10*a* and 10*b* are coupled through the first capacitor structure C1. In this embodiment, the multi-section antenna with a shared radiator comprises two antenna modules 10*a* and 10*b*, but not limited to. In other embodiments, the multi-section antenna with a shared radiator could comprise more antenna modules and first capacitor structures. Those antenna modules are all coupled through the first capacitor structures. The first capacitor structure C1 could isolate the low frequency signals between the antenna modules 10*a* and 10*b*.

In this embodiment, the radio frequency module 11 and the antenna module 10*a* are coupled through the second capacitor structure C2. However, the radio frequency module 11 may be coupled with the antenna module 10*b* in other embodiments. The radio frequency module 11 is used to receive or transmit radio frequency signals by the antenna module 10*a* and 10*b*. The radio frequency signal is a high frequency signal. For example, the radio frequency signal can be, but not limited to, electromagnetic wave signals in Wi-Fi frequency band, LTE frequency band or 5G New Radio frequency band under the standards thereof.

In this embodiment, the sensing module 12 is coupled with the antenna module 10*a* through a first inductor L1.

However, the sensing module 12 may be coupled with the antenna module 10*b* in other embodiments. The sensing module 12 is used to sense a capacitance value of a parasitic capacitance of the antenna module 10*a*. The change of the capacitance value is a low frequency signal. The distance between an object, such as a human body, and the antenna module 10*a* or whether the object contacts the antenna module 10*a* can be determined according to the capacitance value measured by the sensing module 12.

The second capacitor structure C2 can isolate low frequency signals, and the first inductor L1 can isolate high frequency signals. Therefore, the radio frequency module 11 and the sensing module 12 will not interfere with each other. The radio frequency module 11 and the sensing module 12 can share the same antenna modules 10*a* and 10*b* as radiators, thereby saving cost and component space.

Figure 2A:
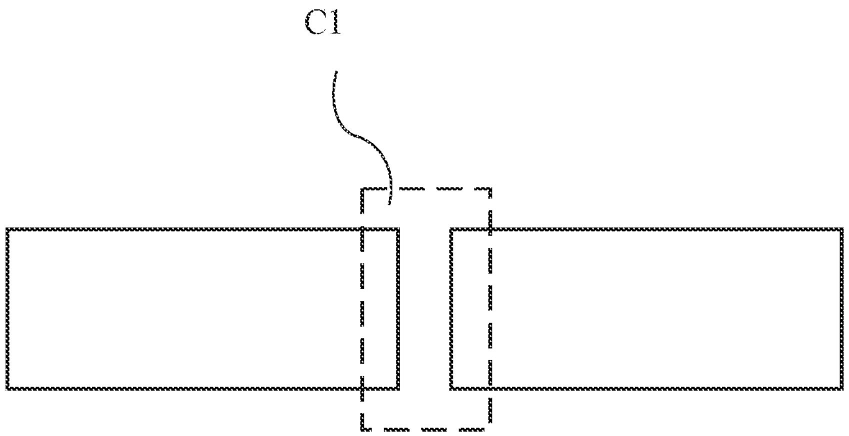
Figure 2B:
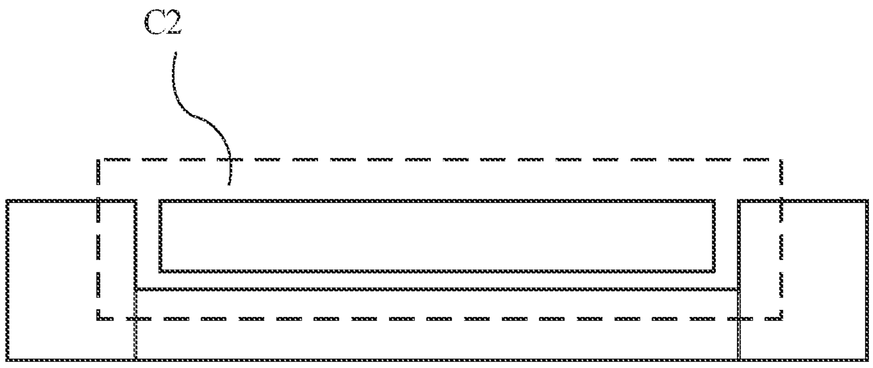

Please refer to FIGS. 2*a* and 2*b*. FIGS. 2*a* and 2*b* illustrate schematic views of a structure of the distributed capacitor structure according to a second embodiment of the present invention. In an embodiment, the first capacitor structure C1 could be a distributed capacitor structure or a lumped distributed capacitor structure. For example, the distributed capacitor structure can be, but not limited to, the structures shown in FIGS. 2*a* and 2*b*. For example, the lumped capacitor structure can be, but not limited to, a multi-layer ceramic capacitor (MLCC).

In an embodiment, the second capacitor structure C2 could be a distributed capacitor structure or a lumped distributed capacitor structure. The second capacitor structure C2 can be the same as or different from the first capacitor structure C1.

Figure 3:
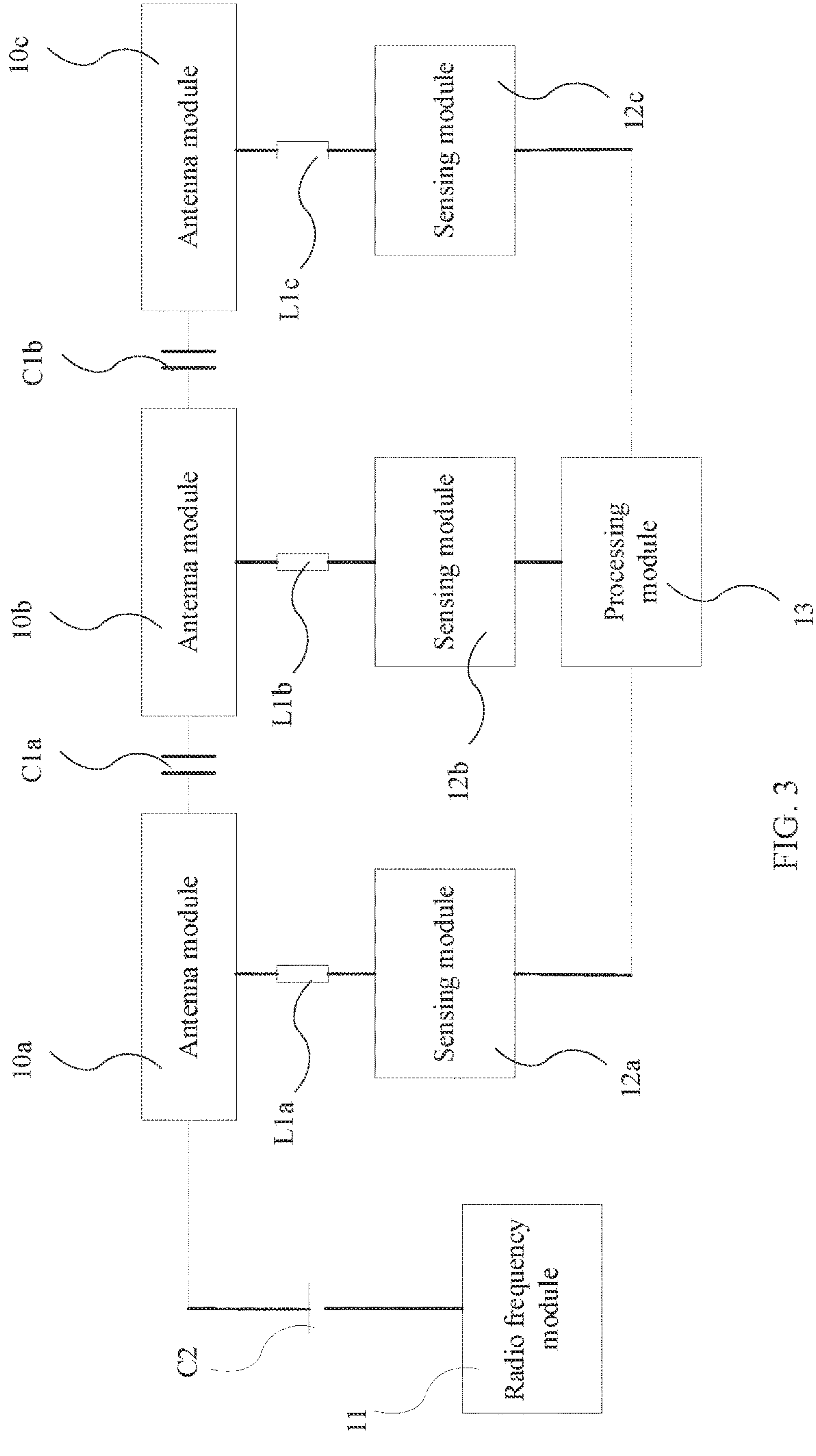
FIG. 3 illustrates a schematic view of a structure of the multi-section antenna with a shared radiator according to a third embodiment of the present invention.

Please refer to FIG. 3. FIG. 3 illustrates a schematic view of a structure of the multi-section antenna with a shared radiator according to a third embodiment of the present invention. As shown in the figure, the multi-section antenna with a shared radiator could comprise a plurality of the sensing modules 12*a*, 12*b*, and 12*c*. The sensing module 12*a* is coupled with the corresponding antenna module 10*a* through the first inductor L1*a*. The sensing module 12*b* is coupled with the corresponding antenna module 10*b* through the first inductor L1*b*. The sensing module 12*c* is coupled with the corresponding antenna module 10*b* through the first inductor L1*c*. The sensing modules 12*a*, 12*b*, and 12*c* are used to sense the capacitance values of the parasitic capacitances of the antenna modules 10*a*, 10*b*, and 10*c*, respectively. The antenna modules 10*a*, 10*b*, and 10*c* are coupled through the first capacitor structures C1*a*, C1*b*.

Furthermore, the distance between the object and the antenna module 10*a* or whether the object contacts the antenna module 10*a* can be determined according to the capacitance value measured by the sensing module 12*a*. The distance between the object and the antenna modules 10*b*, 10*c* corresponds to the capacitance value measured by the sensing modules 12*b*, 12*c*, respectively.

In the embodiment of FIG. 3, the number of sensing modules 12*a*, 12*b*, and 12*c* is identical to the number of antenna modules 10*a*, 10*b*, and 10*c*, and both are three. In other embodiments, the number of sensing modules and the number of antenna modules can be adjusted optionally according to the requirements. For example, the multi-section antenna with a shared radiator according to the present invention could comprise three sensing modules and five antenna modules. The antenna modules that are not coupled with the sensing module can be used as a dummy part to avoid accidental touch.

In an embodiment, the multi-section antenna with a shared radiator could further comprise a processing module 13. The processing module 13 is connected to the sensing modules 12*a*, 12*b*, and 12*c*. The processing module 13 is used to determine the distance between an object and the antenna module 10*a* or whether the object contacts the antenna module 10*a* according to the capacitance value measured by the sensing module 12*a*. Similarly, the processing module 13 is also used to determine the distance between the object and the antenna modules 10*b*, 10*c* or whether the object contacts the antenna modules 10*b*, 10*c* according to the capacitance values measured by the sensing modules 12*b*, 12*c* respectively.

In an embodiment, the multi-section antenna with a shared radiator could comprise a plurality of the sensing modules 12*a*, 12*b*, and 12*c*, and the processing module 13 is further used to determine the contact between the object and the antenna modules 10*a*, 10*b*, and 10*c* in chronological order. Furthermore, the sequence or the order of the contacts between the human hand and the antenna modules 10*a*, 10*b*, 10*c* represents a specific gesture. For example, touching the antenna modules 10*a*, 10*b*, and then 10*c* in sequence represents a first gesture, and touching the antenna modules 10*c*, 10*b*, and then 10*a* in sequence represents a second gesture. The processing module 13 can send different gesture signals according to different gestures, and these gesture signals can be further converted into corresponding operation instructions. In other embodiments, the multi-section antenna with a shared radiator may comprise more sensing modules or more antenna modules to determine more complicated gestures or make the gestures more accurate.

Figure 4:
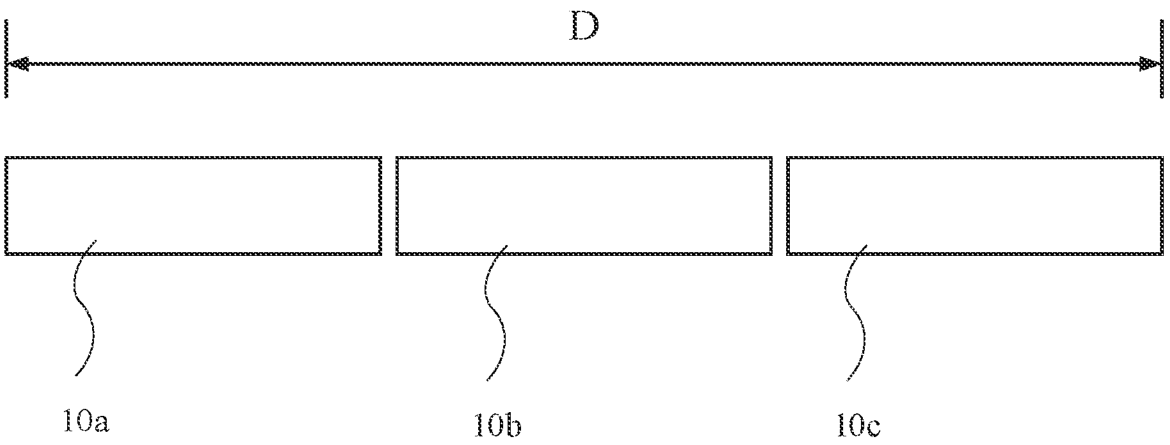
FIG. 4 illustrates a schematic view of a structure of the multi-section antenna with a shared radiator according to a fourth embodiment of the present invention.

Please refer to FIG. 4. FIG. 4 illustrates a schematic view of a structure of the multi-section antenna with a shared radiator according to a fourth embodiment of the present invention. In an embodiment, each of the antenna module 10*a*, 10*b*, and 10*c* could have a rectangular shape, but not limited to. For example, a ring structure can be divided into several parts, each of which may be as an antenna module.

In an embodiment, the antenna modules 10*a*, 10*b*, and 10*c* may have a total length D which could be equal to ⅛ to 1 wavelength of the radio frequency signal.

Figure 5:
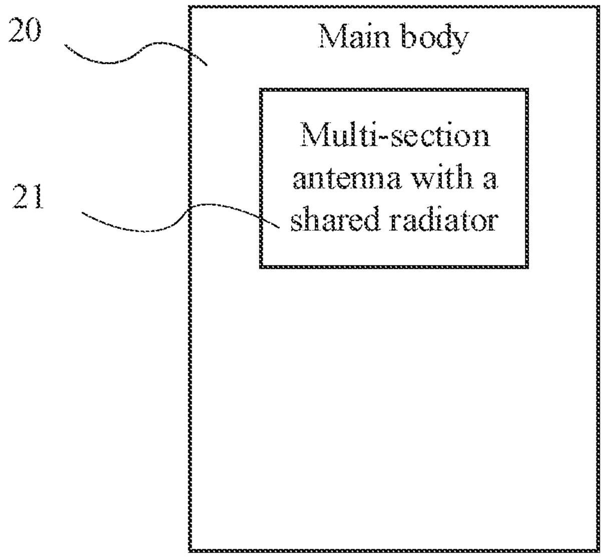
FIG. 5 illustrates a block diagram of the wearable device according to a fifth embodiment of the present invention.

Please refer to FIG. 5. FIG. 5 illustrates a block diagram of the wearable device according to a fifth embodiment of the present invention. As shown in the figure, the wearable device according to the present invention comprises a main body 20 and a multi-section antenna with a shared radiator 21 according to any one of said embodiments of the present invention. For example, the wearable device may be, but not limited to a set of earphones, a watch or a pair of glasses. A set of earphones herein may be a device converting electric signals into audio and held near users' ear, for example, but not limited to, a set of wired/wireless earphones/headsets, a single earpiece; and a pair of glasse herein may be a device worn on or over users' eye/eyes, for example, but not limited to, a pair of glasses, a single eye glass piece or an eyewear. The main body 20 is used to be worn on a part of a human body. For example, the main body 20 may comprise a hook or a strap to be worn on such as ears or wrists of a human body. The multi-section antenna with a shared radiator 21 is disposed on the main body 20.

Figure 6:
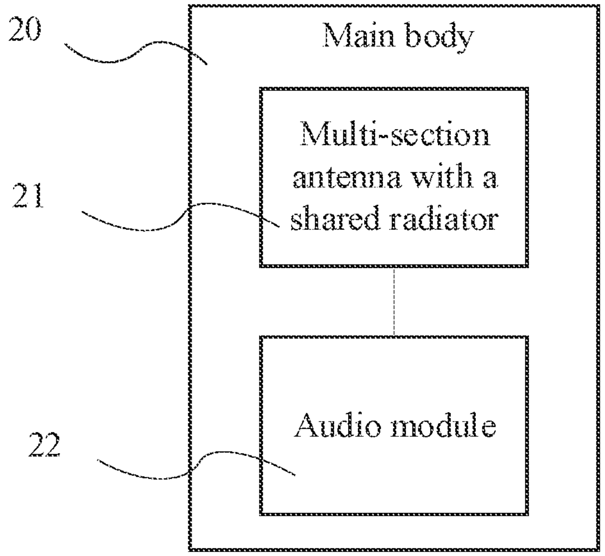
FIG. 6 illustrates a block diagram of the wearable device according to a sixth embodiment of the present invention.

Please refer to FIG. 6. FIG. 6 illustrates a block diagram of the wearable device according to a sixth embodiment of the present invention. In an embodiment, the wearable device may further comprise an audio module 22 such as a speaker. The audio module 22 is disposed on the main body 20. The audio module 22 is used for playing corresponding audio according to the radio frequency signal received by the multi-section antenna with a shared radiator 21. In addition, the wearable device of the present invention can also perform corresponding operations according to the gesture sensed by the multi-section antenna with a shared radiator 21. For example, but not limited to, the operations can be to increase or decrease the volume of the audio.

Figure 7:
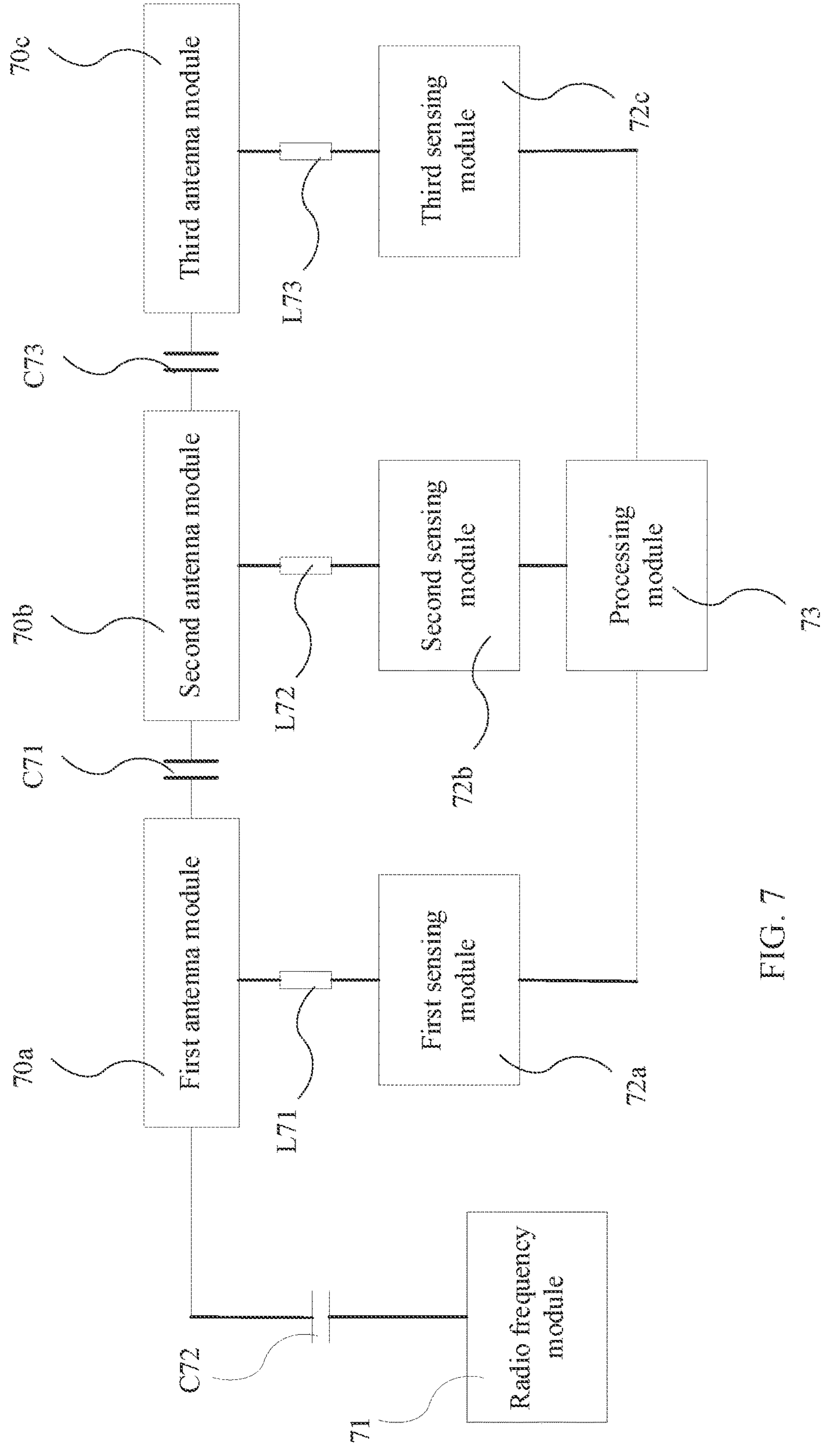
FIG. 7 illustrates a schematic view of a structure of the multi-section antenna with a shared radiator according to a seventh embodiment of the present invention.

Please refer to FIG. 7. FIG. 7 illustrates a schematic view of a structure of the multi-section antenna with a shared radiator according to a seventh embodiment of the present invention. As shown in the figure, the present invention further provides a multi-section antenna with a shared radiator comprising a first antenna module 70*a*, a second antenna module 70*b*, a first capacitor structure C71, a second capacitor structure C72, a radio frequency module 71, a first inductor L71, a first sensing module 72*a*, a second inductor L72 and a second sensing module 72*b*. The first capacitor structure C71 is coupled between the first antenna module 70*a* and the second antenna module 70*b*. The second capacitor structure C72 is coupled with the first antenna module 70*a*. The radio frequency module 71 is coupled with the second capacitor structure C72. The radio frequency module 71 is used to receive or transmit radio frequency signals by the first antenna module 70*a* and the second antenna module 70*b*. The first inductor L71 is coupled with the first antenna module 70*a*. The first sensing module 72*a* is coupled with the first inductor L71. The second inductor L72 is coupled with the second antenna module 70*b*. The second sensing module 72*b* is coupled with the second inductor L72.

In an embodiment, the multi-section antenna with a shared radiator further comprises a third antenna module 70*c*, a third capacitor structure C73, a third inductor L73 and a third sensing module 72*c*. The third capacitor structure C73 is coupled between the second antenna module 70*b* and the third antenna module 70*c*. The third inductor L73 is coupled with the third antenna module 70*c*. The third sensing module 72*c* is coupled with the third inductor L73. The radio frequency module 71 is used to receive or transmit radio frequency signals by the first antenna module 70*a*, the second antenna module 70*b*, and the third antenna module 70*c*.

In an embodiment, the first capacitor structure C71 or the second capacitor structure C72 is a distributed capacitor structure or a lumped distributed capacitor structure.

In an embodiment, the third capacitor structure C73 is a distributed capacitor structure or a lumped distributed capacitor structure.

In an embodiment, the multi-section antenna with a shared radiator further comprises a processing module 73. The processing module 73 is connected to the first sensing module 72*a* and the second sensing module 72*b*. The processing module 73 is used to determine the distance between an object and the first antenna module 70*a* or the distance between an object and the second antenna module 70*b* or whether the object contacts the first antenna module 70*a* or the second antenna module 70*b* according to the capacitance value of the parasitic capacitance of the first antenna module 70*a* or the second antenna module 70*b* measured by the first sensing module 72*a* or the second sensing module 72*b* respectively.

In an embodiment, the processing module 73 is further used to determine the contact between the object and the first antenna module 70*a* and the contact between the object and the second antenna module 70*b* in chronologic order.

In an embodiment, the multi-section antenna with a shared radiator further comprises a processing module 73. The processing module 73 is connected to the first sensing module 72*a*, the second sensing module 72*b* and the third sensing module 72*c*. The processing module 73 is used to determine the distance between an object and the first antenna module 70*a*, the distance between an object and the second antenna module 70*b* or the distance between an object and the third antenna module 70*c* or whether the object contacts the first antenna module 70*a*, the second antenna module 70*b* or the third antenna module 70*c* according to the capacitance value of the parasitic capacitance of the first antenna module 70*a*, the second antenna module 70*b* or the third antenna module 70*c* measured by the first sensing module 72*a*, the second sensing module 72*b* or the third sensing module 72*c* respectively.

In an embodiment, the processing module 73 is further used to determine the contact between the object and the first antenna module 70*a*, the contact between the object and the second antenna module 70*b* and the contact between the object and the third antenna module 70*c* in chronologic order.

In an embodiment, each of the first antenna module 70*a*, the second antenna module 70*b* or the third antenna module 70*c* has a rectangular shape.

In an embodiment, the first antenna module 70*a*, the second antenna module 70*b* and the third antenna module 70*c* have a total length which is equal to ⅛ to 1 wavelength of the radio frequency signal.

In summary, the multi-section antenna with a shared radiator according to the present invention comprises a plurality of antenna modules coupled through a first capacitive structure. The antenna modules are coupled with a radio frequency module through a second capacitor structure. The radio frequency module is used to receive or transmit radio frequency signals by the antenna modules. On the other hand, the antenna modules are further coupled with a sensing module through a first inductor. The sensing module is used to sense a capacitance value of a parasitic capacitance of the antenna module. In other words, the radio frequency module and the sensing module can share the antenna modules, so the space and cost of the radiator structure can be saved. The first capacitor structure, the second capacitor structure and the first inductor can effectively separate the high and low frequency signals, so the high frequency signal of the radio frequency module and the low frequency signal of the sensing module will not interfere with each other. The multi-section antenna with a shared radiator according to the present invention is able to receive and send the radio frequency signals and sense the distance between an object and the antenna at the same time. Moreover, a wearable device using the multi-section antenna with a shared radiator according to the present invention may be miniaturized and the cost of producing the wearable device may be decreased.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A multi-section antenna with a shared radiator, comprising:

a plurality of antenna modules coupled to each other through a first capacitor structure;

a radio frequency module coupled with one of the antenna modules through a second capacitor structure, wherein the plurality of antenna modules are treated as one shared radiator when the radio frequency module is used to receive or transmit radio frequency signals by the coupled antenna module; and a plurality of sensing modules coupled with the plurality of antenna modules through a corresponding plurality of first inductors, wherein each sensing module is used to sense a capacitance value of a parasitic capacitance of a corresponding antenna module.

2. The multi-section antenna with a shared radiator of claim 1, wherein the first capacitor structure is a distributed capacitor structure.

3. The multi-section antenna with a shared radiator of claim 1, wherein each of the sensing modules is coupled to each of the corresponding antenna modules through each of the first inductors.

4. The multi-section antenna with a shared radiator of claim 3, wherein a number of the plurality of sensing modules is identical to a number of the plurality of antenna modules.

5. The multi-section antenna with a shared radiator of claim 1, further comprising a processing module connected to the plurality of sensing modules, and the processing module is used to determine a distance between an object and the antenna module or whether the object contacts the antenna module according to the capacitance value measured by each sensing module.

6. The multi-section antenna with a shared radiator of claim 5, wherein the processing module is further used to determine the contact between the object and the antenna modules in chronological order.

7. The multi-section antenna with a shared radiator of claim 1, wherein each antenna module has a rectangular shape.

8. The multi-section antenna with a shared radiator of claim 7, wherein the antenna modules have a total length which is equal to from ⅛ to 1 wavelength of the radio frequency signal.

9. The multi-section antenna with a shared radiator of claim 1, wherein the second capacitor structure is a distributed capacitor structure.

10. The multi-section antenna with a shared radiator of claim 1, wherein the first capacitor structure is a lumped distributed capacitor structure.

11. The multi-section antenna with a shared radiator of claim 1, wherein the second capacitor structure is a lumped distributed capacitor structure.

12. The multi-section antenna with a shared radiator of claim 1, being configured to improve a sensing ability due to an arrangement of the plurality of antenna modules and the plurality of sensing modules.

* * * * *